(12) United States Patent
Fujii et al.

(10) Patent No.: US 12,509,385 B2
(45) Date of Patent: Dec. 30, 2025

(54) GLASS PLATE AND METHOD FOR MANUFACTURING GLASS PLATE

(71) Applicant: Nippon Electric Glass Co., Ltd., Shiga (JP)

(72) Inventors: Takahide Fujii, Shiga (JP); Hisatoshi Aiba, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 632 days.

(21) Appl. No.: 17/795,733

(22) PCT Filed: Jan. 13, 2021

(86) PCT No.: PCT/JP2021/000836
§ 371 (c)(1),
(2) Date: Jul. 27, 2022

(87) PCT Pub. No.: WO2021/157300
PCT Pub. Date: Aug. 12, 2021

(65) Prior Publication Data
US 2023/0069785 A1    Mar. 2, 2023

(30) Foreign Application Priority Data
Feb. 4, 2020    (JP) .................. 2020-017123

(51) Int. Cl.
C03B 33/09    (2006.01)
C03B 33/037    (2006.01)
C03C 23/00    (2006.01)

(52) U.S. Cl.
CPC .......... *C03B 33/091* (2013.01); *C03B 33/037* (2013.01); *C03C 23/0025* (2013.01); *C03C 23/007* (2013.01)

(58) Field of Classification Search
None
See application file for complete search history.

(56) References Cited

U.S. PATENT DOCUMENTS

2013/0288010 A1* 10/2013 Akarapu .................. B24B 9/10
428/192
2014/0290310 A1* 10/2014 Green ............... B23K 26/0006
65/117
(Continued)

FOREIGN PATENT DOCUMENTS

JP    2006-256944    9/2006
JP    2009-221046    10/2009
(Continued)

OTHER PUBLICATIONS

JP-2009221046-A EPO Machine Translation retrieved Jan. 10, 2025. (Year: 2025).*
(Continued)

*Primary Examiner* — David Sample
(74) *Attorney, Agent, or Firm* — Wenderoth, Lind & Ponack, L.L.P.

(57) ABSTRACT

A method of manufacturing a glass sheet includes: an initial crack forming step of forming an initial crack on a mother glass sheet (MG); and a cleaving step of causing a crack (CR) to propagate in a direction along a preset cleaving line (CL) and in a thickness direction of the mother glass sheet (MG), the crack starting from the initial crack, through use of a thermal stress generated by heating of an irradiation region (SP) of laser light (L) and cooling of a cooling region (CP). The cleaving step includes heating a surface layer (SL) and an inner portion (IL) of the mother glass sheet (MG) with the laser light (L) in the irradiation region (SP) and setting a difference $\Delta T$ between a highest temperature in the irradiation region (SP) and a lowest temperature in the cooling region to 575° C. or more.

8 Claims, 5 Drawing Sheets

(56) References Cited

U.S. PATENT DOCUMENTS

| | | | |
|---|---|---|---|
| 2014/0340730 A1* | 11/2014 | Bergh | B32B 17/10155 359/275 |
| 2017/0334774 A1* | 11/2017 | Weber | B32B 17/06 |
| 2017/0369357 A1 | 12/2017 | Vogt et al. | |
| 2018/0009706 A1* | 1/2018 | Luo | C03C 21/002 |
| 2018/0127308 A1 | 5/2018 | Leivo et al. | |
| 2018/0186677 A1 | 7/2018 | Ito et al. | |

FOREIGN PATENT DOCUMENTS

| | | |
|---|---|---|
| JP | 2009221046 A * | 10/2009 |
| JP | 2011-57494 | 3/2011 |
| JP | 2011-116611 | 6/2011 |
| JP | 2016-128365 | 7/2016 |
| JP | 2017-128493 | 7/2017 |
| JP | 2018-515411 | 6/2018 |
| KR | 10-2017-0128493 | 11/2017 |
| WO | 2004/014625 | 2/2004 |

OTHER PUBLICATIONS

Request for the Submission of an Opinion issued Sep. 24, 2024 in corresponding Korean Patent Application No. 10-2022-7029030, with English-language Translation.
International Preliminary Report on Patentability and Written Opinion of the International Searching Authority issued Jul. 28, 2022 in corresponding International (PCT) Patent Application No. PCT/JP2021/000836.
International Search Report dated Apr. 6, 2021 in corresponding International Application No. PCT/JP2021/000836.

* cited by examiner

GLASS PLATE AND METHOD FOR MANUFACTURING GLASS PLATE

TECHNICAL FIELD

The present invention relates to a method of manufacturing a glass sheet having a predetermined shape by cleaving a mother glass sheet through irradiation with laser light.

BACKGROUND ART

As is well known, various glass sheets to be used for displays, such as a liquid crystal display and an OLED display, CLED lighting, a solar cell panel, and the like are each formed into a predetermined shape through the step of cutting a mother glass sheet.

For example, in Patent Literature 1, there is disclosed laser cleaving as a technology of cutting a mother glass sheet. In the laser cleaving, first, an initial crack is formed on a mother glass sheet (glass film having a thickness of 0.2 mm or less) with a crack former such as a diamond cutter. Next, the mother glass sheet, is heated through irradiation with laser light along a preset cleaving line set on the mother glass sheet, and the heated portion is cooled by a refrigerant such as cooling water jetted from a cooling unit. With this result, a thermal stress (thermal shock) is generated in the mother glass sheet, and a crack is caused to propagate along the preset cleaving line (preset cutting line), starting from the initial crack. Thus, the mother glass sheet can be cut.

CITATION LIST

Patent Literature 1: JP 2011-116611 A

SUMMARY OF INVENTION

Technical Problem

In the laser cleaving according to Patent Literature 1, a $CO_2$ laser is used, and hence only a surface layer of the mother glass sheet is heated. Because of this, a sufficient thermal stress cannot be caused to act on an inner portion of the mother glass sheet, and the quality of an end surface (cleaved surface) of the cleaved glass sheet may be degraded. That is, when the mother glass sheet becomes thicker, defects such as microcracks may be formed on the end surface of the cleaved glass sheet. As a result, there may occur a problem in that the strength of each of the end surface and the vicinity thereof is decreased.

An object of the present invention is to provide a glass sheet having high strength in each of an end surface formed of a cleaved surface and the vicinity thereof.

Solution to Problem

According to one embodiment of the present invention, which has been devised in order to achieve the above-mentioned object, there is provided a method of manufacturing a glass sheet, comprising: an initial crack forming step of forming an initial crack on a mother glass sheet; and a cleaving step of causing a crack to propagate in a direction along a preset, cleaving line and in a thickness direction of the mother glass sheet, the crack starting from the initial crack, through use of a thermal stress generated by heating of an irradiation region of laser light and cooling of a cooling region, wherein the cleaving step comprises heating a surface layer and an inner portion of the mother glass sheet with the laser light in the irradiation region and setting a difference $\Delta T$ between a highest, temperature in the irradiation region and a lowest, temperature in the cooling region to 575° C. or more.

With this configuration, the inner portion as well as the surface layer of the mother glass sheet is heated to high temperature with the laser light and then rapidly cooled. Because of this, a compressive stress layer is formed on an edge portion of the surface of the glass sheet; on a side which the laser light enters and a cleaved end surface of the glass sheet. In this case, when the difference $\Delta T$ between the highest temperature in the irradiation region of the laser light and the lowest temperature in the cooling region is managed to 575° C. or more, the compressive stress layer having a high maximum compressive stress value can be reliably formed. As a result, the strength of each of the end surface of the glass sheet and the vicinity thereof is improved merely by cleaving the mother glass sheet.

In the above-mentioned configuration, the laser light is preferably CO laser light, Er laser light, Ho laser light, or HF laser light.

When such laser light is selected, the inner portion as well as the surface layer of the mother glass sheet can be efficiently heated, and hence the compressive stress layer is easily formed on the edge portion of the surface of the glass sheet on the side which the laser light enters and the cleaved end surface of the glass sheet.

In the above-mentioned configuration, the cooling region is preferably cooled with a refrigerant.

The cooling region may be allowed to stand to cool (natural cooling by the atmosphere). However, when the cooling region is actively cooled with the refrigerant, a value of the difference $\Delta T$ between the highest temperature in the irradiation region of the laser light and the lowest temperature in the cooling region can be increased. That is, when the cooling region is cooled with the refrigerant, the maximum compressive stress value of the compressive stress layer formed on the edge portion of the surface of the glass sheet and the end surface thereof can be increased.

According to one embodiment of the present invention, which has been devised in order to achieve the above-mentioned object, there is provided a glass sheet, comprising a first surface, a second surface, and an end surface connecting the first surface and the second surface to each other, wherein the end surface is formed of a cleaved surface, and wherein an edge portion of the first surface and the end surface each comprise a compressive stress layer.

With this configuration, the end surface is formed of the cleaved surface, and hence a flat and smooth surface having less defects (cracks) is formed. In addition, the compressive stress layer is formed on the edge portion of the first surface and the end surface, and hence the strength of each of the end surface of the glass sheet and the vicinity thereof is improved.

In the above-mentioned configuration, the compressive stress layer is preferably continuous from the edge portion of the first surface to the end surface.

With this configuration, the compressive stress layer is formed also on a corner portion that is a boundary portion between the edge portion of the first surface and the end surface. Because of this, breakage starting from the corner portion can be suppressed.

In the above-mentioned configuration, the compressive stress layer preferably has a maximum compressive stress value of 0.1 MPa or more.

With this configuration, the strength of each of the edge portion of the first surface and the end surface is sufficiently increased.

In the above-mentioned configuration, the glass sheet is preferably formed of alkali-free glass.

That is, according to the present invention, even in a glass sheet that cannot be chemically tempered, such as alkali-free glass, the strength of each of the edge portion of the first surface and the end surface can be increased.

In the above-mentioned configuration, the glass sheet preferably has a sheet, thickness of from 0.05 µm to 5 µm.

In the glass sheet having a sheet thickness in such numerical range, the compressive stress layer is easily formed on the end surface.

In the above-mentioned configuration, the compressive stress layer preferably has a thickness direction dimension along the end surface of from 25 µm to 50 µm.

With this configuration, the thickness of the compressive stress layer is sufficiently ensured, and hence the strength of the end surface can be suitably maintained.

In the above-mentioned configuration, the compressive stress layer preferably has a width direction dimension along the first surface of from 1 mm to 5 mm.

With this configuration, the width of the compressive stress layer is sufficiently ensured, and hence the strength of the edge portion of the first surface can be suitably maintained.

Advantageous Effects of Invention

According to the present invention, the glass sheet having high strength in each of an end surface formed of a cleaved surface and the vicinity thereof can be provided.

BRIEF DESCRIPTION OF DRAWINGS

FIG. 3 is a perspective view for illustrating a cleaving step according to a fifth embodiment.

DESCRIPTION OF EMBODIMENTS

Now, embodiments of the present invention are described with reference to the drawings. Overlapping description may be omitted by denoting corresponding constituent elements in the embodiments by the same reference symbols. When only part of a configuration is described in each of the embodiments, a configuration in other embodiments that has already been described may be adopted for other parts of the configuration. In addition, configurations may be combined in a combination explicit in the description of each of the embodiments, and not only that, part of configurations of a plurality of the embodiments may be combined in an even implicit combination as long as the combination has no particular disadvantage.

First Embodiment

Figure 1:
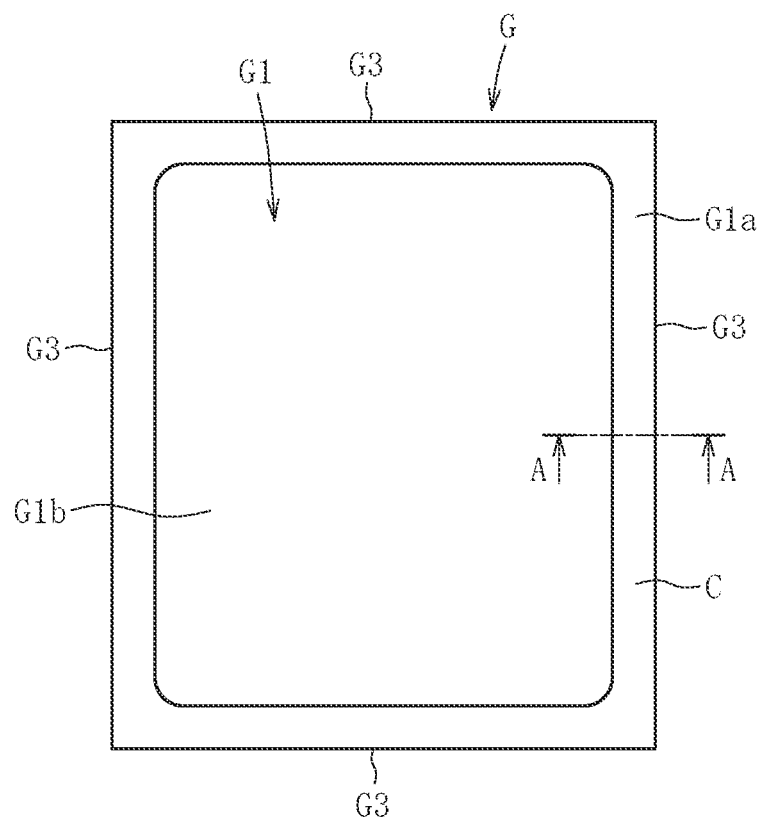
FIG. 1 is a plan view for illustrating a glass sheet according to a first embodiment.
Figure 2:
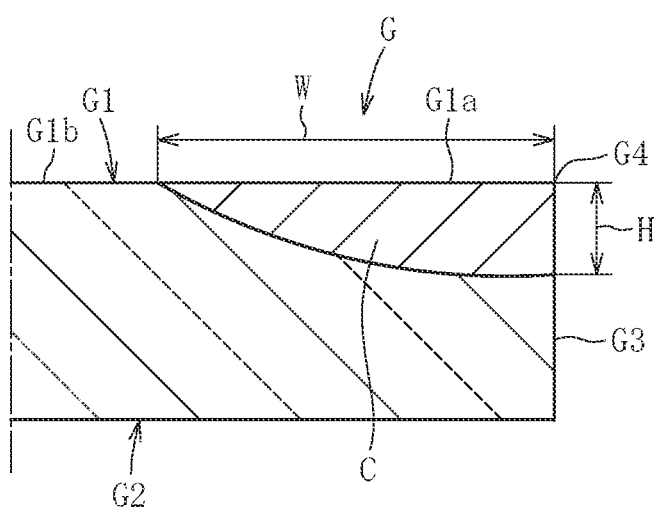
FIG. 2 is a sectional view taken along the line A-A of the glass sheet illustrated in FIG. 1.

As illustrated in FIG. 1 and FIG. 2, in a first embodiment, a glass sheet G is illustrated. The glass sheet G according to the first embodiment, comprises a first, surface G1, a second surface G2, and an end surface G3 connecting the first surface G1 and the second surface G2 to each other.

The shape of the glass sheet G is not particularly limited, but is a rectangular shape in the first, embodiment.

The sheet thickness of the glass sheet G is preferably from 0.05 mm to 5 mm, more preferably from 0.3 mm to 1.0 mm.

The glass sheet G may be formed of, for example, silicate glass, silica glass, boresilicate glass, soda glass, soda lime glass, or aluminosilicate glass, but is formed of alkali-free glass in the first embodiment. That is, the glass sheet G is not a chemically tempered glass. Herein, the alkali-free glass refers to glass that does not substantially contain an alkali component (alkali metal oxide), specifically glass having a weight ratio of the alkali component of 3,000 ppm or less. The weight ratio of the alkali component in the present invention is preferably 1,000 ppm or less, more preferably 500 ppm or less, most preferably 300 ppm or less.

Each of the end surfaces G3 corresponding to four sides of the glass sheet G is formed of a surface that is cleaved (hereinafter referred to as "cleaved surface"). Each of the end surfaces G3 is a flat plane substantially orthogonal to the first surface G1 and the second surface G2, and is crackless. Herein, the term "crackless" means surface properties in which, when a surface roughness Ra of the end surface G3 is measured with a contact-type surface roughness measuring instrument (for example, Surfcom 1400D manufactured by Tokyo Seimitsu Co., Ltd.), the surface roughness Ra is less than a detection lower limit to become impossible to measure.

An edge portion G1a of the first surface G1 and the end surface G3 each comprise a compressive stress layer C.

As illustrated in FIG. 1, when the glass sheet G is viewed in plan view, the compressive stress layer C is formed in a frame shape along the entire circumference of the edge portion G1a of the first surface G1. In other words, the compressive stress layer C is not formed on a center portion G1b of the first surface G1 excluding the edge portion G1a. Such compressive stress layer C improves the strength of the end surface G3 of the glass sheet G and the vicinity thereof. Herein, the first surface G1 is an incident surface of laser light L described later.

As illustrated in FIG. 2, when the glass sheet G is viewed in sectional view, the compressive stress layer C extends to the end surface G3 along the first surface G1 in a surface layer portion of the edge portion G1a of the first surface G1. As a result, the compressive stress layer C is continuous from the edge portion G1a of the first surface G1 to the end surfaces S3. That is, the compressive stress layer C is formed also on a corner portion G4 that is a boundary portion between the edge portion G1a of the first surface G1 and the end surface G3. With this configuration, breakage starting at the corner portion G4 can be suppressed. For example, when the compressive stress layer C is used as a cover glass under a state in which the first surface G1 is exposed, breakage starting at the corner portion G4 can be effectively suppressed. In the first embodiment, the compressive stress layer C is formed only on the first surface G2 side, and is not formed on the second surface G2 side.

The maximum compressive stress value of the compressive stress layer C (maximum value of the compressive stress value of the compressive stress layer of the first surface G1 and the compressive stress value oi the compressive stress layer of the end surface G3) is preferably 0.1 MPa or more, 0.3 MPa or more, more preferably 0.5 MPa or more, roost preferably 0.7 MPa or more. The upper limit of the maximum compressive stress value of the compressive stress layer C is, for example, 5 MPa, 4 MPa, 3 MPa, 2 MPa, or 1 MPa. Herein, the maximum compressive stress value is measured by preparing a sectional sample by cutting the glass sheet G or the like and observing the internal stress distribution of the sectional sample through use of WPA-micro manufactured by Photonic Lattice, Inc.

The compressive stress layer C has a thickness direction dimension (maximum value) H along the end surface G3 of preferably from 25 μm to 50 μm, more preferably from 40 μm to 50 μm. The compressive stress layer C has a width direction dimension (maximum value) W along the first surface G1 of preferably from 1 mm to 5 mm, more preferably from 1 mm to 3 mm.

Second Embodiment

Figure 3:
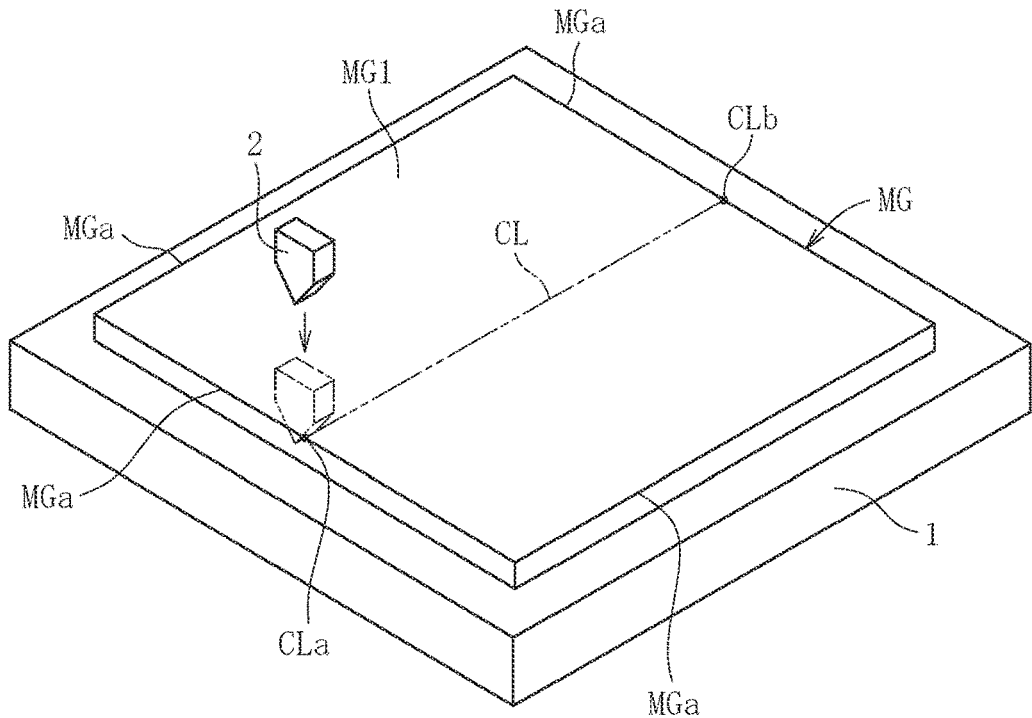
FIG. 3 is a perspective view for illustrating an initial crack forming step according to a second embodiment.
Figure 4:
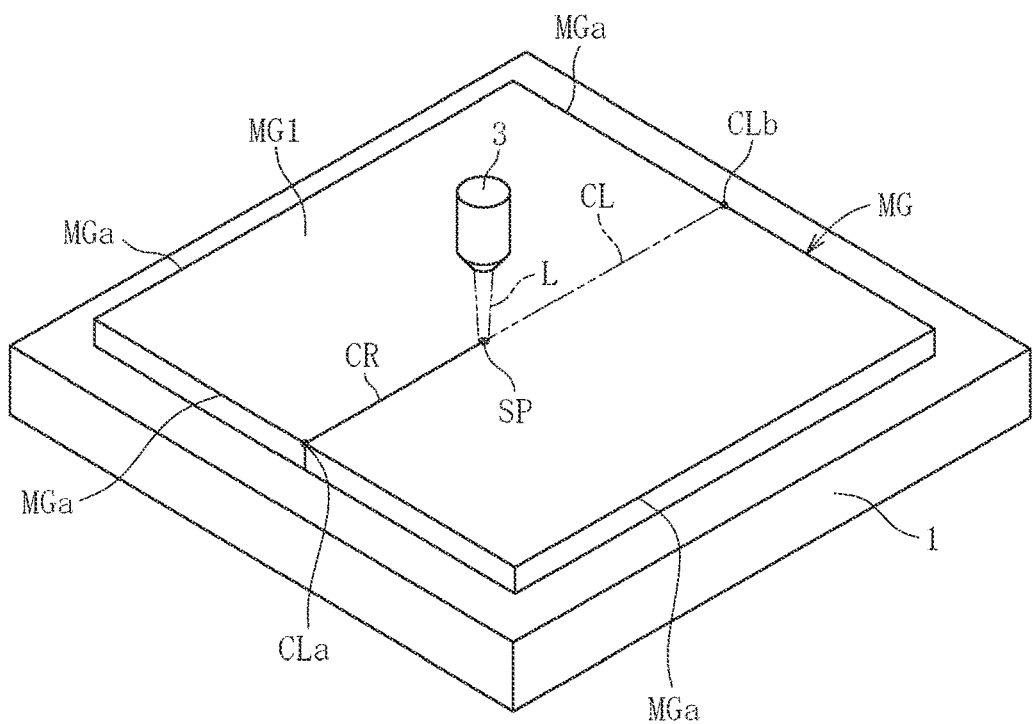
FIG. 4 is a perspective view for illustrating a cleaving step according to the second embodiment.
Figure 5:
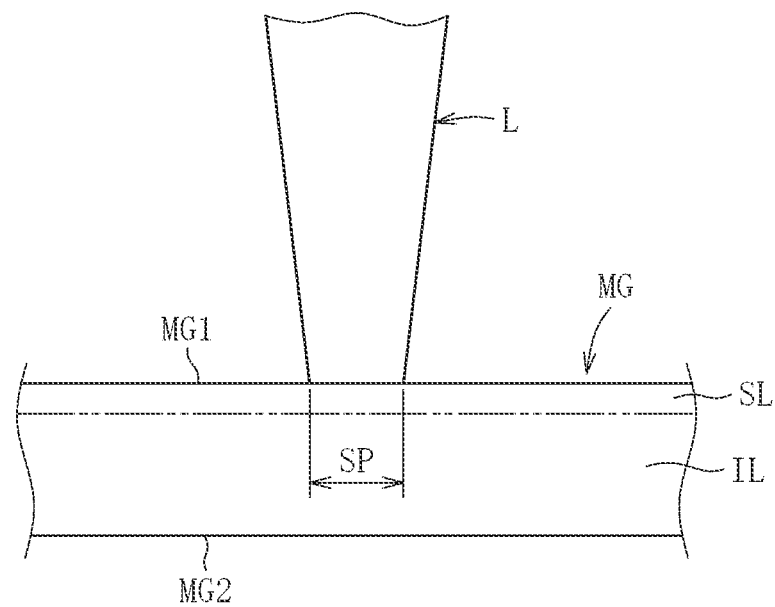
FIG. 5 is a side view of a mother glass sheet.

As illustrated in FIG. 3 to FIG. 5, in a second embodiment, a method of manufacturing the glass sheet G is illustrated.

The method of manufacturing the glass sheet G according to the second embodiment comprises a cutting step of cutting a mother glass sheet MG to form one or more glass sheets. The mother glass sheet MG is formed into a rectangular shape by cutting a glass ribbon, which is continuously formed into a strip shape by, for example, a down-draw method such as an overflow down-draw method or a float method, in a width direction and then removing a selvage portion.

The cutting step comprises an initial crack forming step of forming an initial crack on the mother glass sheet MG and a cleaving step of causing the initial crack to propagate by causing a thermal stress to act on the mother glass sheet MG.

In the initial crack forming step, an initial crack is formed on part of a first surface MG1 of the mother glass sheet MG placed on a surface plate 1 with a clack forming member 2. As illustrated in FIG. 3, a linear preset cleaving line CL is set on the mother glass sheet MG. The preset cleaving line CL has a cleaving start point CLa set in one end portion thereof and a cleaving end point CLb set in the other end portion thereof. The cleaving start point CLa and the cleaving end point CLb are each set in a corner portion MGa of the mother glass sheet MG (in a midway portion of one side MGa of the rectangular mother glass sheet MG). The crack forming member 2 is formed of a pointed scriber such as a sintered diamond cutter, but is not limited thereto. The crack forming member 2 may be formed of a diamond pen, a cemented carbide cutter, sandpaper, or the like.

As illustrated in FIG. 3, in the initial crack forming step, the crack forming member 2 is lowered from above the mother glass sheet MG to be brought into contact with the edge portion of the first surface MG1 of the mother glass sheet MG. In the second embodiment, the crack forming member 2 comes into contact with the corner portion MGa (boundary portion between the edge portion and the end surface) of the edge portion of the first surface MG1 of the mother glass sheet MG. As a result, the initial crack is formed at the cleaving start point CLa of the preset cleaving line CL.

As illustrated in FIG. 4, in the cleaving step, the laser light L is radiated to the initial crack on the first surface MG1 by a laser irradiation device 3 and is scanned along the preset cleaving line CL. Specifically, the laser irradiation device 3 is configured to be three-dimensionally movable, and moves above the mother glass sheer MG placed on the surface plate 1 in a predetermined direction, to thereby scan the laser light L from the cleaving start point CLa to the cleaving end point CLb along the preset cleaving line CL. As a result, an irradiation region SP of the laser light L is heated, and the heated irradiation region SP moves along the preset cleaving line CL. Meanwhile, in the second embodiment, the first surface MG1 of the mother glass sheet MG is allowed to stand to cool (natural cooling by the atmosphere). That is, a portion of the mother glass sheet MG excluding the irradiation region SP is set to a cooling region to be cooled by heat radiation. Due to the thermal stress generated by the heating of the irradiation region SP and the cooling of the cooling region, a crack CR starting from the initial crack propagates along the preset cleaving line CL. In addition, the crack CR propagates in the entire thickness direction of the mother glass sheet MC, and propagates to a second surface MG2 positioned on an opposite side to the first surface MG1.

The laser light L radiated front the laser irradiation device 3 is preferably a CO laser, an Er laser (Er:YAG laser), a Ho laser (Ho:YAG laser), or a HF laser. The laser light L may be pulse laser light, or continuous laser light. When the CO laser light is used as the laser light, the wavelength thereof is set to preferably from 5.25 μm to 5.75 μm.

As illustrated in FIG. 4 and FIG. 5, the laser irradiation device 3 irradiates the first surface MG1 of the mother glass sheet MG with the laser light L so that a circular irradiation region (laser spot) SP is formed. The irradiation diameter (spot diameter) of the laser light L is preferably from 1 mm to 8 mm, more preferably from 2 mm to 6 mm.

When $CO_2$ laser light is used as in the related art, a surface layer SL (for example, a range of from the first surface MG1 to a depth of about 10 μm) of the mother glass sheet MG (first surface MG1) is only heated. Because of this, the amount of heat sufficient for generating the thermal stress that causes the crack to propagate in the thickness direction may not be applied.

In contrast, in the cleaving step in this manufacturing method, through use of CO laser light L or the like capable of being stably radiated with high output, even with the circular irradiation region SP, an inner portion IL as well as the surface layer SL on the first surface MG1 side of the mother glass sheet MG can be heated. Because of this, the amount of heat sufficient for generating the thermal stress that causes the crack CR to propagate in the thickness direction can be applied. Herein, the surface layer SL of the mother glass sheet MG refers to a layer extending from the first surface MG1 of the mother glass sheet MG to a depth of 10 μm. The inner portion IL of the mother glass sheet MG refers to a region having a depth of more than 10 μm from the first surface MG1 (see FIG. 5).

Accordingly, in the cleaving step, through use of the CO laser light L or the like, the mother glass sheet MG is heated to a high temperature in the inner portion IL as well as the surface layer SL, and then rapidly cooled by being allowed to stand to cool. Due to such heating and rapid cooling, the compressive stress layer C is formed on the glass sheet G obtained by cleaving the mother glass sheet MG (see FIG. 1 and FIG. 2). As described in the first embodiment, the compressive stress layer C is formed on the edge portion G1a of the first surface G1 of the glass sheet G which the laser light L enters and the cleaved end surface G3 of the glass sheet G.

As described above, the cleaving step is performed under the condition that the laser light L heats the surface layer SL and the inner portion IL of the mother glass sheet MG in the irradiation region SP, and a difference ΔT between the highest temperature in the irradiation region SP and the lowest temperature in the cooling region becomes 575° C. or more. With this configuration, the maximum compressive stress value (for example, 0.1 MPa or more) of the compressive stress layer C formed on the glass sheet G can be increased. As a result/the strength of each of the end surface (cleaved surface) G3 of the glass sheet G and the vicinity thereof can be improved merely by cleaving the mother glass sheet MG. When the compressive stress layer C is formed on each of the end surfaces G3 of the four sides of the rectangular glass sheet G, the mother glass sheet MG is cleaved by the above-mentioned cleaving method at respective positions corresponding to the four sides of the glass sheet G.

It is preferred that, the difference ΔT between the highest temperature in the irradiation region SP and the lowest temperature in the cooling region be 600° C. or more.

In the second embodiment, the mother glass sheet MG is cooled by being allowed to stand to cool, and hence substantially the entire first surface MP1 is set to the cooling region. Because of this, the difference ΔT between the highest temperature in the irradiation region SP and the lowest temperature in the cooling region is calculated by measuring the temperature (upper surface temperature) of the first surface MG1 in each of the irradiation region SP of the laser light L and the separation position separated by 10 mm on a back side from the irradiation region SP. Herein, the back side is based on the scanning direction (traveling direction) of the laser light L. More specifically, the back side means the cleaving start point CLa side with respect to the irradiation region SP. The temperature of the first surface MP1 may be measured through use of, for example, thermography for measuring a glass temperature (PI450G7 manufactured by Optris). When the first surface MG1 is cooled by being allowed to stand to cool, the temperature of the first surface MP1 is substantially the same regardless of the measurement position as long as the measurement position is separated from the irradiation region SP by a predetermined distance or more. Accordingly, the separation distance from the irradiation region SP is not limited to 10 mm on the back side from the irradiation region SP, and may be set to an arbitrary distance at which the influence of heating by the laser light L can be ignored.

It is preferred that the cleaving step be performed under the condition that the thermal stress $\sigma_T$ of the mother glass sheet MG calculated by the following numerical, expression is 100 MPa or more.

$$\sigma_T = \frac{E \cdot \alpha \cdot \Delta T}{2(1-\nu)} \quad \text{[Math. 1]}$$

In the expression, E represents the Young's modulus (MPa) of the mother glass sheet, α represents the thermal expansion coefficient (/° C.) of the mother glass sheet, ν represents the Poisson's ratio of the mother glass sheet, and ΔT represents the difference between the temperature (° C.) of the mother glass sheet in the irradiation region of the laser light and the temperature (° C.) of the mother glass sheet in the cooling region.

When the cleaving step is performed under the condition that the thermal stress $\sigma_T$ is 100 MPa or more, a sufficient thermal stress acts on the mother glass sheet MG, and hence the maximum compressive stress value of the compressive stress layer C formed on the glass sheet G is more reliably increased. It is more preferred that the cleaving step be performed under the condition that the thermal stress $\sigma_T$ is 105 MPa or more.

Herein, as is clear from the numerical expression 1, the value of the thermal stress $\sigma_T$ is increased when the ΔT is increased. The value of the ΔT may be increased by increasing the highest temperature in the irradiation region SP and/or decreasing the lowest temperature in the cooling region. As a method of increasing the highest temperature in the irradiation region SP, there are given, for example, decreasing the scanning speed of the laser light L and increasing the output (W) of the laser light L. Meanwhile, as a method of decreasing the lowest temperature in the cooling region, there is given, for example, actively cooling the cooling region with a refrigerant or the like (see a third embodiment described later and the like). The configuration of actively cooling the cooling region by supplying a refrigerant or the like is not essential, and the mother glass sheet MG may be cleaved even when the coding region is allowed to stand to cool without supplying a refrigerant or Die like as in the second embodiment.

Third Embodiment

Figure 6:
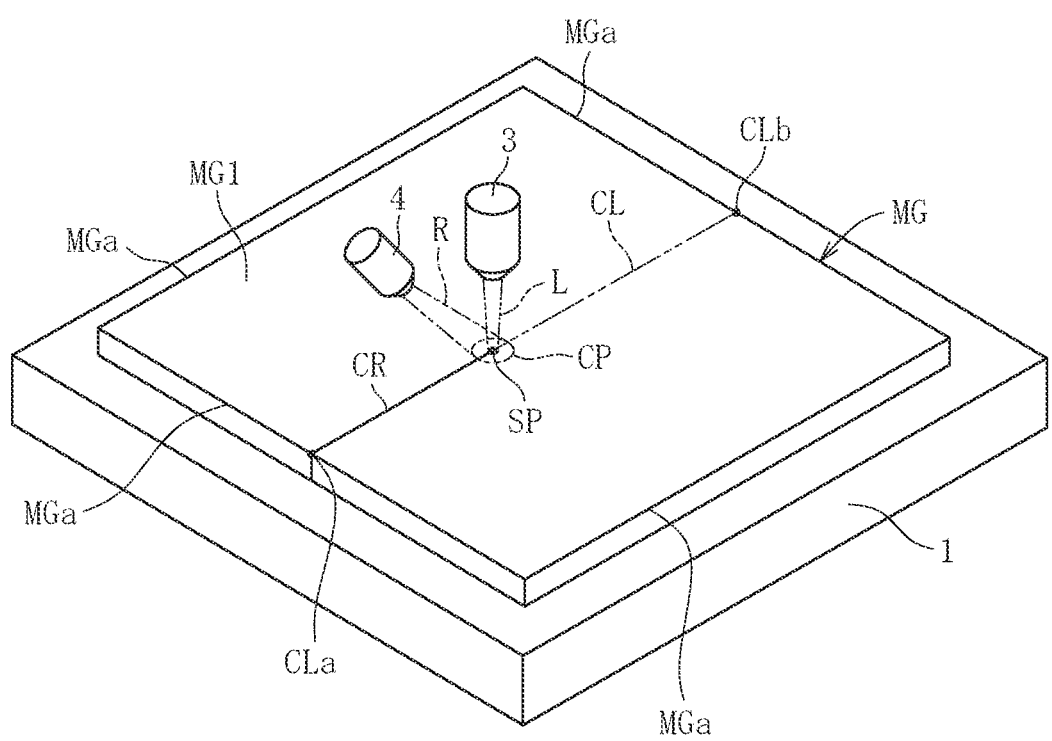
FIG. 6 is a perspective view for illustrating a cleaving step according to a third embodiment.

As illustrated in FIG. 6, in a third embodiment, a method of manufacturing the glass sheet G is illustrated. The third embodiment is different from the second embodiment in that, in the cleaving step, the cooling region CP in the vicinity of the irradiation region SP of the laser light L is cooled by a refrigerant R (for example, air) jetted from a cooling device 4.

The cooling device 4 is configured to move following the laser irradiation device 3. The cooling device 4 jets the refrigerant R from a nozzle thereof toward the irradiation region SP of the laser light L and the cooling region CP in the periphery thereof. As the refrigerant R, an inert gas, such as He or Ar, or a $N_2$ gas that is non-oxidizing is suitably used in addition to air. In the third embodiment, the thermal stress that causes the crack CR to propagate can be generated more remarkably by heating the irradiation region SP with the laser light L and cooling the cooling region CP with the refrigerant R. When a CO laser is used, CO laser light is absorbed by moisture, and hence the output of the CO laser light is attenuated by the moisture. Accordingly, it is better not to use water as the refrigerant R. However, this is not the case when the output attenuation of the laser light L is effectively used.

The laser irradiation device 3 and the cooling device 4 may be integrally formed. For example, a jetting port, of the nozzle of the cooling device 4 may be formed into an annular shape, and the laser irradiation device 3 may be arranged on an inner side of the jetting port having an annular shape.

Herein, depending on the cutting condition, the crack CR propagates under a state of slightly deviating from the preset cleaving line CL in some cases. In this case, this deviation can be reduced by cooling the periphery of the irradiation region SP of the laser light L. The cooling may be performed from the back, the front, or the side of the irradiation region SP of the laser light L, and is preferably performed from the back as illustrated in FIG. 6 from the viewpoint of further reducing the deviation. The front, the back, and the side are based on a scanning direction (traveling direction) of the laser light L. For example, performing cooling from the front means that cooling is performed through use of the cooling device 4 arranged on the cleaving end point CLb side with respect to the irradiation region SP (laser irradiation device 3). In addition, performing cooling from the back means that cooling is performed through use of the cooling device 4 arranged on the cleaving start point CLa side with respect to the irradiation region SP (laser irradiation device 3).

The cooling region CP in which the refrigerant R is jetted from the nozzle of the cooling device 4 is not required to overlap the irradiation region SP of the laser light L. That is, the refrigerant R may be jetted to a position away from the laser spot SP. From the viewpoint of further reducing the deviation of the crack CR, the distance between the cooling region CP and the irradiation region SP is preferably shorter, and the cooling region CP more preferably overlaps the irradiation region SP partially or entirely. Herein, the cooling region CP in which the refrigerant R is jetted from the nozzle means a range which the refrigerant R jetted from the nozzle directly reaches and cools the mother glass sheet MG, and excludes the case in which the refrigerant R that is brought into contact with the mother glass sheet MG and changed in flow direction indirectly reaches and cools the irradiation region SP.

From the viewpoint of further reducing the deviation of the crack CR from the preset cleaving line CL, it is preferred that the scanning speed of the laser light L be low. For example, in the case where the material for the mother glass sheet MG is alkali-free glass, when the thickness is 0.4 mm or more, the scanning speed of the laser light L is set to preferably from 3 mm/sec to 15 mm/sec. When the thickness is less than 0.4 mm, the scanning speed is set to preferably from 3 mm/sec to 100 mm/sec. The preferred scanning speed of the laser light L varies depending on the material for the mother glass sheet MG, and tends to increase along with an increase in thermal expansion coefficient. In addition, the preferred scanning speed of the laser light L tends to increase along with a decrease in thickness of the mother glass sheet MG. The flow rate of the refrigerant R jetted from the nozzle may be set to, for example, from 10 l/min to 50 l/min.

When the cooling region CP does not overlap the irradiation region SP, the difference ΔT between the highest temperature in the irradiation region SP and the lowest temperature in the cooling region CP is calculated by measuring the temperature (upper surface temperature) of the first surface MG1 of the mother glass sheet MG in each of the irradiation region SP that is the laser spot of the laser light L and the cooling region CP that is a jetting spot of the refrigerant R.

When the cooling region CP overlaps the irradiation region SP, the highest temperature in the irradiation region SP is measured by measuring the highest temperature of the first surface MG1 of the mother glass sheet MG in the irradiation region SP. Meanwhile, the lowest temperature in the cooling region CP is measured by measuring the lowest temperature of the first surface MG1 of the mother glass sheet MG at a position (for example, a separation position separated by 10 mm on a back side from the irradiation region SP) in the cooling region CP excluding the portion overlapping the irradiation region SP. With this configuration, the difference ΔT between the highest temperature in the irradiation region SP and the lowest temperature in the cooling region CP is calculated.

The lowest temperature in the cooling region CP is preferably 5° C. or less, more preferably 0° C. or less.

Fourth Embodiment

Figure 7:
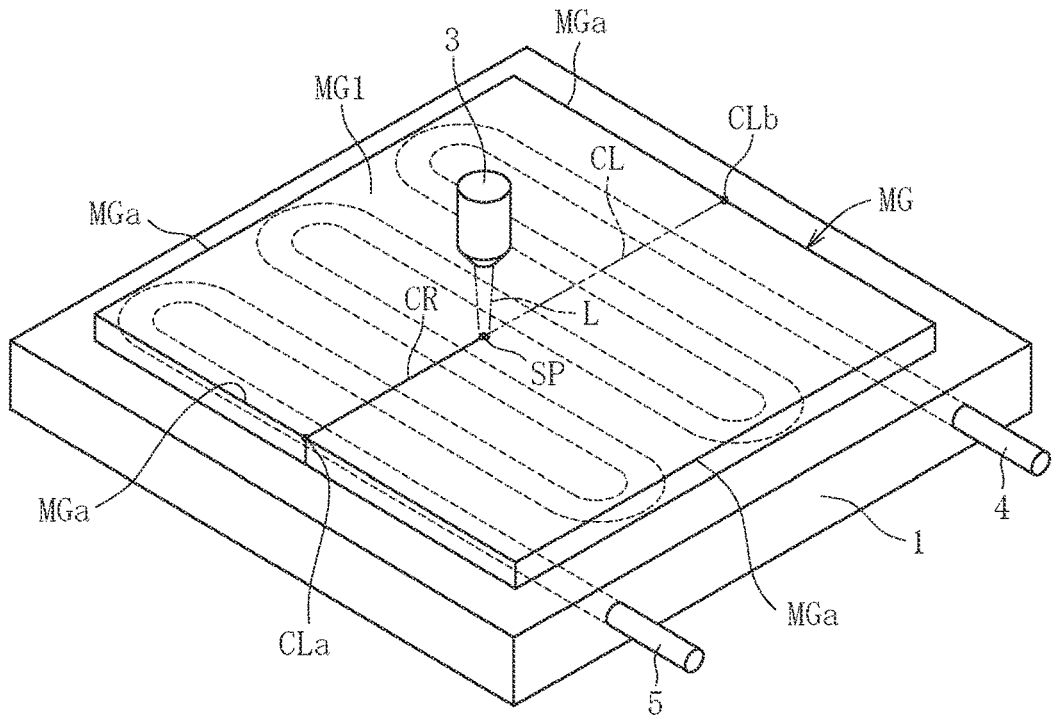
FIG. 7 is a perspective view for illustrating a cleaving step according to a fourth embodiment.

As illustrated in FIG. 7, in a fourth embodiment, a method of manufacturing the glass sheet G is illustrated. The fourth embodiment is different from the third embodiment in configuration of the cooling device 4. The cooling device 4 according to the fourth embodiment is provided in the surface plate 1. The cooling device 4 comprises a refrigerant pipe 5 arranged in or on a lower surface of the surface plate 1. The refrigerant pipe 5 is arranged in a meandering manner so as to cool the surface plate 1 in a wide range. In the fourth embodiment, in the cleaving step, the surface plate 1 is cooled by causing a refrigerant made of a gas or a liquid to flow through the refrigerant pipe 5. With this step, the second surface (back surface) MG2 of the mother glass sheet MG brought into contact with surface plate 1 is cooled. In the fourth embodiment, substantially the entire second surface MG2 of the mother glass sheet MG that is brought into contact with the surface plate 1 can be cooled, and hence the propagation of the crack CR in the thickness direction can be accelerated.

In this case, substantially the entire first surface MG1 its also similarly cooled by cooling the second surface MG2 of the mother glass sheet MG. Because of this, substantially the entire first surface MG1 is set to the cooling region. Accordingly, the difference ΔT between the highest temperature in the irradiation region SP and the lowest temperature in the cooling region is calculated by measuring the temperature (upper surface temperature) of the first surface MG1 of the mother glass sheet MG in each of the irradiation region SP of the laser light L and the separation position separated by, for example, 10 mm on a back side from the irradiation region SP.

Fifth Embodiment

Figure 8:
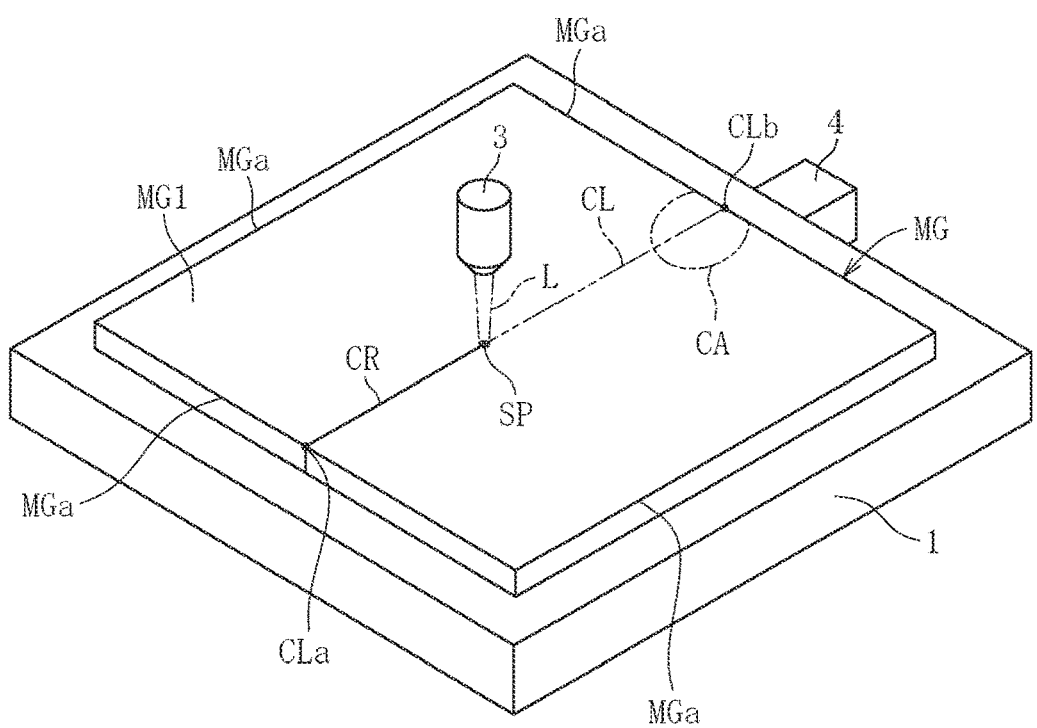

As illustrated in FIG. 8, in a fifth embodiment, a method of manufacturing the glass sheet G is illustrated. The fifth embodiment is different from the fourth embodiment in configuration of the cooling device 4. The cooling device 4 according to the fifth embodiment is configured to cool part of the surface plate 1. The cooling device 4 is provided on part of the surface plate 1 in the vicinity of the cleaving end point CLb so as to cool the cleaving end point CLb of the preset cleaving line CL set on the mother glass sheet MG and a peripheral region CA thereof. Herein, in the vicinity of the cleaving end point CLb, the area for heating the glass in a cutting area is reduced, and the heating by the laser light L becomes insufficient. As a result, it is difficult to apply a thermal stress sufficient for causing the crack CR to propagate, and hence uncut portions are liable to be generated. According to the fifth embodiment, the propagation of the crack CR can be accelerated at the cleaving end point CLb, and the generation of uncut portions can be prevented.

In the fifth embodiment, the mother glass sheet MG is cooled by being allowed to stand to cool before the irradiation region SP reaches the peripheral region CA. Because of this, the difference ΔT between the highest temperature in the irradiation region SP and the lowest temperature in the cooling region can be calculated by the same method as in the second embodiment. Meanwhile, the mother glass sheet MG is cooled by the cooling device 4 after the irradiation region SP reaches the peripheral region CA. Because of this, the difference ΔT between the highest temperature in the irradiation region SP and the lowest temperature in the cooling region (peripheral region CA) can be calculated by the same method as in the fourth embodiment.

Sixth Embodiment

Figure 9:
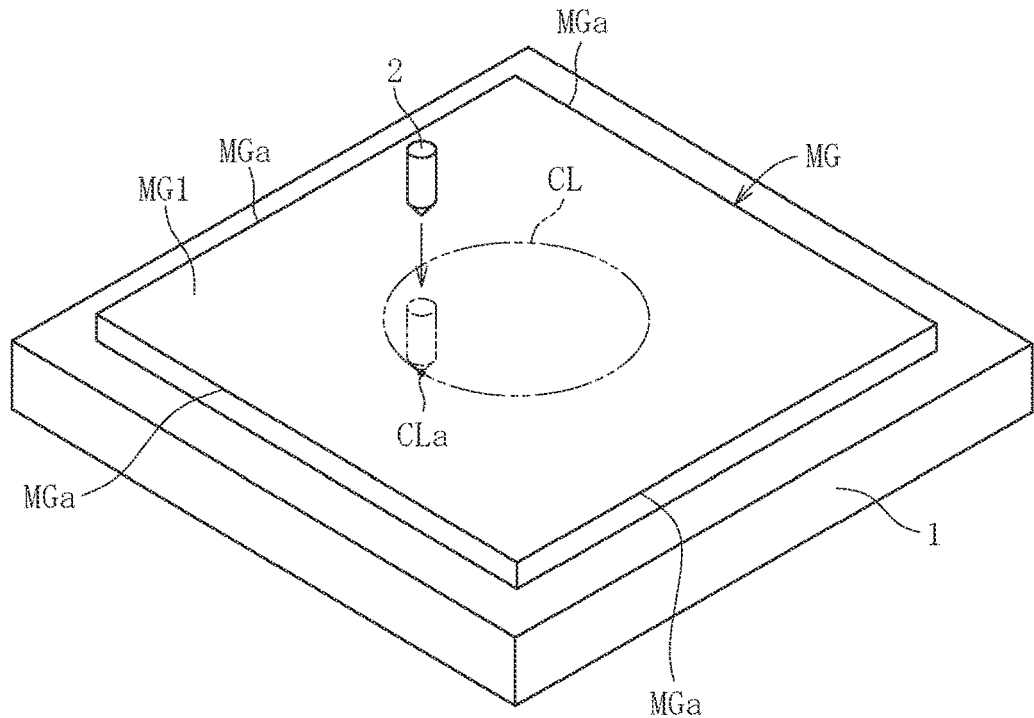
FIG. 9 is a perspective view for illustrating an initial crack forming step according to a sixth embodiment.
Figure 10:
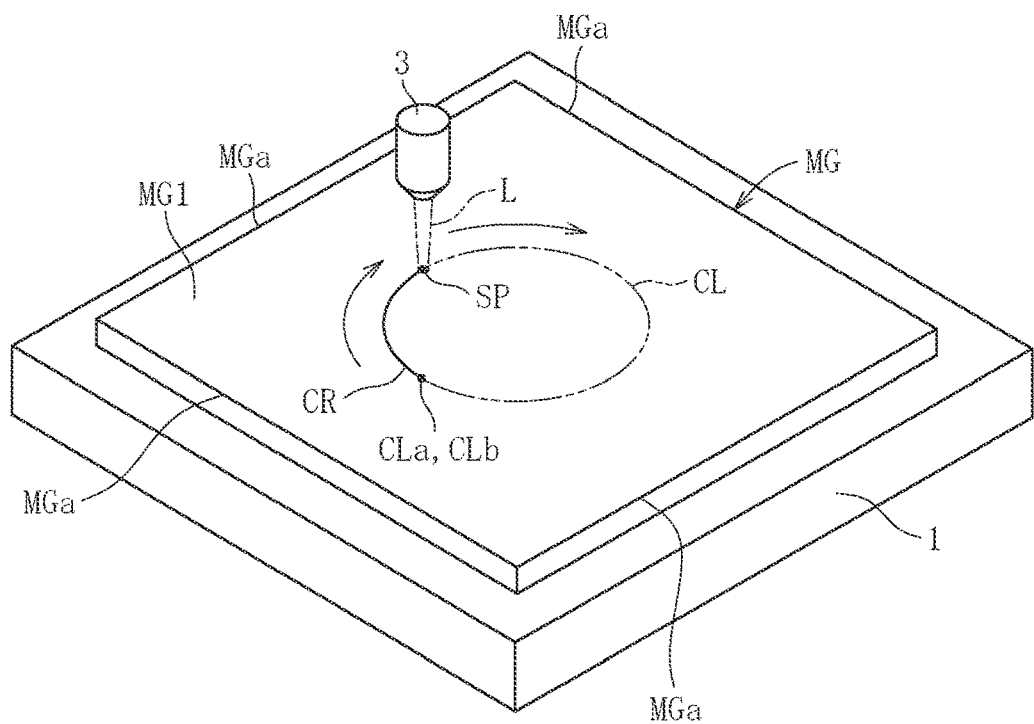
FIG. 10 is a perspective view for illustrating a cleaving step according to the sixth embodiment.

As illustrated in FIG. 9 and FIG. 10, in a sixth embodiment, a method of manufacturing the glass sheet G is illustrated. In the sixth embodiment, in the initial crack, forming step, an initial crack is formed in a center portion of the first surface MG1 of the mother glass sheet KG instead of the corner portion MGa of the mother glass sheet MG. Herein, the center portion refers to a region surrounded by the edge portion including the corner portion MGa (four sides of the mother glass sheet MG formed into a rectangular shape.) of the mother glass sheet MG, and the edge portion of the mother glass sheet MG is excluded from the center portion.

As illustrated in FIG. 9, the circular preset cleaving line CL is set in the center portion of the mother glass sheet MG. In this case, in the initial crack forming step, the crack forming member 2 is brought into contact with an arbitrary point on the preset cleaving line CL as the cleaving start point CLa to form the initial crack.

As illustrated in FIG. 10, in the cleaving step, the CO laser light L is radiated to the cleaving start point CLa at which the initial crack has been formed, and the CO laser light L is scanned along the preset cleaving line CL to reach the cleaving end point CLb, with the result that a circular glass sheet can be cut out from the rectangular mother glass sheet MG.

In the case of the CO laser light L or the like, the mother glass sheet MG can be suitably cut by performing irradiation so as to form the circular irradiation region SP even when the preset cleaving line CL is formed into a linear shape or a curved shape. With this configuration, glass sheets having a wider variety of shapes can be cut out from the mother glass sheet MG. As a result, a glass sheet having another shape such as a rectangular shape can also be cut out from the rectangular mother glass sheet MG by setting the preset cleaving line CL having another shape such as a rectangular shape.

The present invention is net limited to the configurations of the above-mentioned embodiments. In addition, the action and effect of the present invention are not limited to those described above. The present invention may be modified in various forms within the range not departing from the spirit of the present invention.

In each of the above-mentioned embodiments, there has been given the example in which the mother glass sheet is cleaved by forming the initial crack on the first surface of the mother glass sheet, and irradiating the first, surface of the mother glass sheet with the laser light. However, the present invention is not limited to this configuration. The mother glass sheet may be cleaved by, for example, forming the initial crack on the second surface of the mother glass sheet and irradiating the first surface of the mother glass sheet with the laser light. That is, the surface on which the initial crack is formed and the surface (incident surface of the laser light) to which the laser light, is radiated may be different from each other.

In each of the above-mentioned embodiments, there has been given the example in which laser light is radiated to the mother glass sheet as a circular laser spot, but the present invention is not limited to this configuration. The laser spot may have, for example, an elliptical shape, an oval shape, a rectangular shape, or a linear shape. From the viewpoint of increasing the scannability of laser light so as to manufacture glass sheets having various shapes such as a curved shape, it is preferred that the laser spot be a circular laser spot. However, even when the laser spot has a shape other than the circular shape, as long as the long diameter of the shape is 10 mm or less, the mother glass sheet can be cut to an arbitrary shape by providing an angle adjusting mechanism of laser light so that the long diameter is constantly oriented in a tangent direction with respect to the preset cleaving line.

In each of the above-mentioned embodiments, there has been exemplified the mother glass sheet having a flat sheet shape (the first surface and the second surface are fiat surfaces), but the present invention is not limited to this configuration. Even when the mother glass sheet has a curved shape (at least the first surface is a curved surface), the mother glass sheet can be suitably cut (cleaved).

EXAMPLES

Now, Examples according to the present invention are described, but the present invention is not limited to Examples.

The inventors of the present invention have performed a cutting test of a glass sheet through use of a laser irradiation device. In this test, the mother glass sheet was continuously irradiated with CO laser light under the condition that, the difference ΔT between the highest temperature in the irradiation region and the lowest temperature in the cooling region was varied, and thus the mother glass sheet was cleaved into small pieces of glass sheets (Examples 1 and 2) along the preset cleaving line formed into a linear shape.

The glass sheet according to each of Examples 1 and 2 is formed of alkali-free glass (product name: OA-10G from Nippon Electric Glass Co., Ltd.) having a sheet thickness of 0.5 mm. In Examples 1 and 2, the cleaving was performed by blowing cooling air onto the irradiation region of the laser light. That is, the cooling region comprises a portion overlapping the irradiation region. In Example 1, the temperature of the cooling air was set. to 20° C., and in Example 2, the temperature of the cooling air was set to 0° C.

The test results of Examples 1 and 2 are shown in Table 1 below. In this test, the thermal stress acting on the mother glass sheet at the time of cleaving was calculated from the above-mentioned numerical expression 1, and the maximum compressive stress value of the compressive stress layer formed on the cleaved glass sheet was measured. The difference ΔT between the highest temperature in the irradiation region and the lowest temperature in the cooling region was calculated by measuring the highest temperature of the upper surface of the mother glass sheet in the irradiation region and measuring the lowest temperature of the upper surface of the mother glass sheet at a position (separation position separated from the irradiation region) in the cooling region excluding the portion overlapping the irradiation region. The temperature of the upper surface of the mother glass sheet was measured through use of PI450G7 manufactured by Optris. The laser light irradiation conditions were set as follows: (1) laser light type: CO laser light, (2) laser light output: 56 W, (3) laser light scanning speed: 20 mm/s, and (4) laser light irradiation diameter: 6 mm. The maximum compressive stress value of the compressive stress layer formed on the edge portion of the first surface of the glass sheet and the cleaved end surface thereof was measured through use of WPA-micro manufactured by Photonic Lattice, Inc.

TABLE 1

|  | Example 1 | Example 2 |
|---|---|---|
| Young's modulus E (GPa) | 73 | 73 |
| Thermal expansion coefficient $\alpha$ ($\times 10^{-7}$/° C.) | 38 | 33 |
| Poisson's ratio $\nu$ | 0.2 | 0.2 |
| $\Delta T$ (° C.) | 600 | 650 |
| $\sigma_T$ (MPa) | 104 | 112 |
| Maximum compressive stress value (MPa) of compressive stress layer | 0.5 | 0.7 |

As shown in Table 1 above, the thermal stress $\sigma_T$ acting on the mother glass sheet at the time of cleaving is increased to as high as 100 MPa or more by setting the difference $\Delta T$ between the highest temperature in the irradiation region SP and the lowest temperature in the cooling region to 575° C. or more. In addition, such large thermal stress $\sigma_T$ acts on the mother glass sheet, and hence the maximum compressive stress value of the compressive stress layer formed on the edge portion of the first surface of the obtained glass sheet and the cleaved end surface thereof becomes 0.1 MPa or more. In addition, in Example 2 in which the $\Delta T$ is larger than that in Example 1, it can be recognized that both the thermal stress $\sigma_T$ and the maximum compressive stress value of the compressive stress layer are increased.

For comparison, a cutting test of a glass sheet was performed under the condition that the type of the laser light was changed from CO laser light to $CO_2$ laser light. In this case, a part in a thickness direction was not able to be cleaved, and hence it was required to split the mother glass sheet by applying bending stress thereto. As a result, micro-cracks were formed on part of an end surface. In addition, ever, when the cut surface was observed, no compressive stress layer was able to be recognized.

REFERENCE SIGNS LIST

G glass sheet
G1 first surface
G2 second surface
G3 end surface (cleaved surface)
C compressive stress layer
1 surface plate
CL preset cleaving line
CR crack
IL inner portion of mother glass sheet
L laser light
MG mother glass sheet
MG1 first surface
MG2 second surface
SL surface layer of mother glass sheet (first surface)
SP irradiation region (laser spot)
CP cooling region

The invention claimed is:

1. A glass sheet comprising:
   a first surface having a flat plane;
   a second surface having a flat plane; and
   an end surface connecting the first surface and the second surface,
   wherein the end surface is a cleaved surface extending as a flat plane from the first surface to the second surface,
   wherein a compressive stress layer is located at an edge portion of the first surface and at the end surface only at a first surface side of the end surface, and
   wherein the glass sheet is formed of alkali-free glass.

2. The glass sheet according to claim 1, wherein the compressive stress layer is continuous from the edge portion of the first surface to the end surface.

3. The glass sheet according to claim 1, wherein the compressive stress layer has a maximum compressive stress value of 0.1 MPa or more.

4. The glass sheet according to claim 1, wherein the glass sheet has a sheet thickness of from 0.05 mm to 5 mm.

5. The glass sheet according to claim 1, wherein the compressive stress layer has a thickness direction dimension along the end surface of from 25 μm to 50 μm.

6. The glass sheet according to claim 1, wherein the compressive stress layer has a width direction dimension along the first surface of from 1 mm to 5 mm.

7. The glass sheet according to claim 1, wherein the first surface and the second surface are parallel to each other.

8. The glass sheet according to claim 1, wherein the end surface is perpendicular to the first surface and the second surface.

* * * * *